Figure 1:
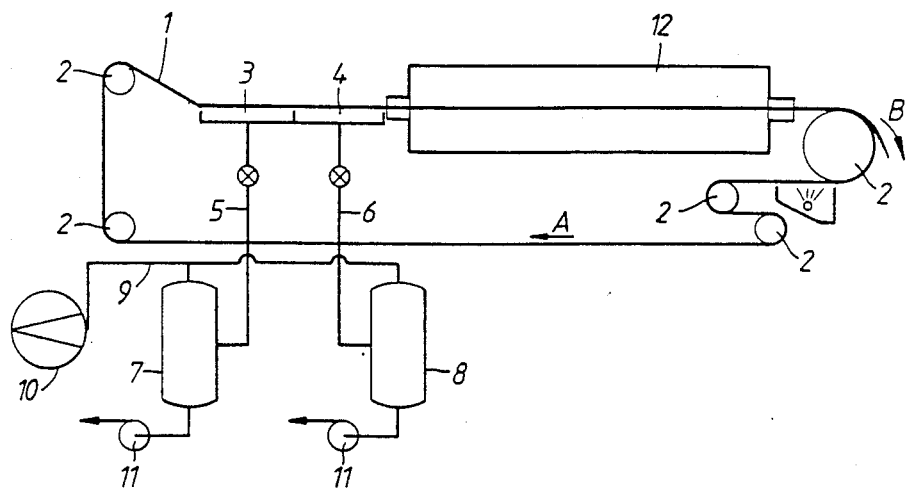

United States Patent [19]

Orizand

[11] Patent Number: 4,962,592
[45] Date of Patent: Oct. 16, 1990

[54] METHOD AND DEVICE FOR REMOVING LIQUID FROM A MIXTURE OF SOLIDS AND LIQUIDS

[75] Inventor: Alexander H. Orizand, Bilthoven, Netherlands

[73] Assignee: Pannevis B. V., Utrecht, Netherlands

[21] Appl. No.: 340,468

[22] Filed: Apr. 19, 1989

[30] Foreign Application Priority Data

Apr. 21, 1988 [NL] Netherlands ............... 8801037

[51] Int. Cl.$^5$ .............................................. B01K 5/00
[52] U.S. Cl. ............................................. 34/1; 34/17; 34/60
[58] Field of Search ................... 34/1, 92, 68, 216, 17, 34/18; 210/400, 700

[56] References Cited

U.S. PATENT DOCUMENTS 4,640,020  2/1987  Wear et al. .......................... 34/68

Primary Examiner—Henry A. Bennet
Attorney, Agent, or Firm—Oblon, Spivak, McClelland, Maier & Neustadt

[57] ABSTRACT

The invention relates to a method and device for removing liquid from a mixture of solids and liquids, whereby the mixture is deposited on the upper part of an endless drivable filter belt and whereby during operation the upper part of the filter belt is led over at least one casing in which a sub-atmospheric pressure is generated. After having passed the casing(s) in which a sub-atmospheric pressure is generated, the mixture is carried through a least one microwave oven by means of the filter belt.

12 Claims, 2 Drawing Sheets

METHOD AND DEVICE FOR REMOVING LIQUID FROM A MIXTURE OF SOLIDS AND LIQUIDS

The invention relates to a method for removing liquid from a mixture of solids and liquids, whereby the mixture is deposited on the upper part of an endless drivable filter belt and whereby during operation the upper part of the filter belt is led over at least one casing in which a sub-atmospheric pressure is generated.

Such a method as well as a device for carrying out such a method is e.g. known from U.S. Pat. No. 2,997,179 and 4,038,193 and EP-A- 0167676. Hereby the mixture is provided in an even layer on the upper part of the filter belt which is pervious to moisture and carried, by means of the belt which is moved in steps or continuously, over the casing(s) in which a sub-atmospheric pressure can be generated during operation. As a result of the generation of the sub-atmospheric pressure in the casing(s) in question the liquid is sucked in through the filter belt which is pervious to moisture and discharged via the casing(s). Actually such devices operate satisfactorily, but a certain quantity of moisture will always be left behind in a cake lying on the filter belt which remains after having passed the casing(s) In which the sub-atmospheric pressure is generated. In many cases, however, it is required that also the remaining quantity of moisture, which cannot be removed from the mixture by moving the mixture over additional casings in which a sub-atmospheric pressure is generated, is removed from the mixture.

In order to be able to effect this it has been proposed in U.S. Pat. No. 3,669,272 to pass pre-heated air through the moist cake. It practice it appeared that it was not possible to achieve sufficiently satisfactory results with this method.

According to the invention a particularly efficient and effective drying of said cake, still slightly moist, can be obtained in that, after having passed the casing(s) In whIch a sub-atmospheric Pressure is generated, the mixture is carried through a least one microwave oven or microwave applicator by means of the filter belt.

Surprisingly it has appeared that by transporting the mixture dried previously through a microwave oven, as a next step after it has passed the last casing in which a sub-atmospheric pressure can be generated, a particularly efficient re-drying of the material can be achieved. The material is namely present on the filter belt in a regular and even layer and it has appeared that exactly such an even layer of a substantially constant thickness is very well suitable for being efficiently re-dried by means of a microwave oven, as a result of which removal of the moisture still present in the mixture on the belt can be efficiently effected.

A further asPect of the invention relates to a device for removing liquid from a mixture of solids and liquids, said device being provided with an endless drivable filter belt and at least one casing, arranged under an upper part of the filter belt, in which a sub-atmospheric pressure can be generated, as is e.g. known from the aforesaid U.S. Pat. No. 2,997,179 and 4,038,193 and EP-A- 0167676. According to the invention there is arranged at least one microwave oven downstream of the casing(s) in which a sub-atmospheric pressure can be generated, seen in the direction of movement of the upper part of the filter belt during normal operation, through which microwave oven the upper part of the filter belt is led.

Hereby an effective removal of liquid from a mixture of solids and liquids can be obtained with a simple construction of the device.

It is noted that from U.S. Pat. No. 4,640,020 there is known a device whereby spherical products, moved by means of a conveyor belt, are moved past microwave generators in order to be dried. Care is taken thereby, however, that the products lie side by side on the belt so as to form an open, thin layer. Said publication does not provide any indication that also a comparatively thick moist cake of a fine, densely caked-together material can be effectively dried by using microwaves.

From DE-A- 2,456,956 it is furthermore known to move substances, dried on a filter belt, through a microwave oven by means of the filter belt, in order to burn the organic constituents in said substances, with a view to determining the quantity of organic constituents. Also this method is entirely different from the method according to the invention, therefore.

The invention will be further explained hereinafter with reference to a few possible embodiments of a device according to the invention diagrammatically illustrated in the accompanying figures.

FIG. 1 diagrammatically illustrates a first embodiment of a device according to the invention.

Figure 2:
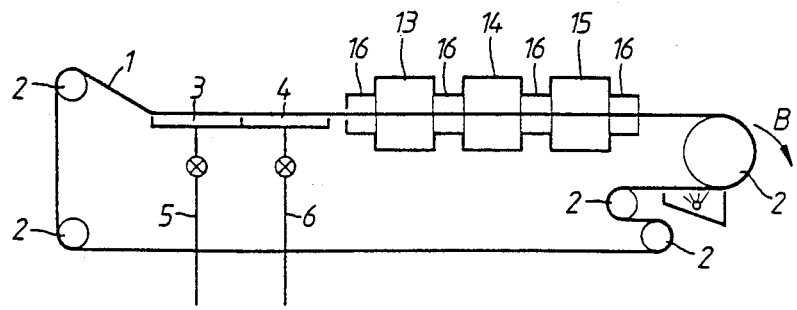

FIG. 2 diagrammatically illustrates a second embodiment of a device according to the invention.

Figure 3:
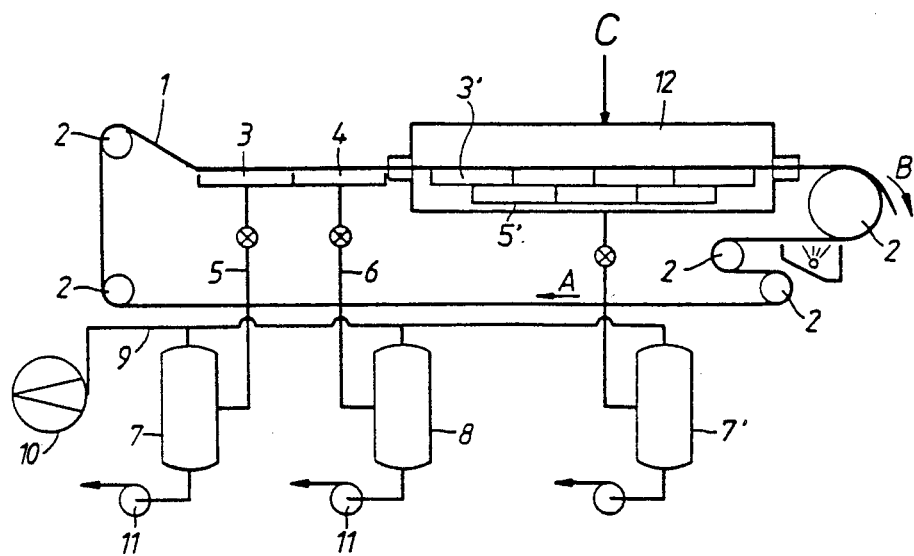

FIG. 3 diagrammatically illustrates a third embodiment of a device according to the invention.

The device illustrated in FIG. 1 comprises an endless filter belt 1, pervious to liquid, which is is led in a manner known per se over several guide rollers or drums 2, at least one of which can be driven in order to be able to move the filter belt in the direction according to arrow A during operation. Near the left-hand end of the substantially horizontally extending upper part of the filter belt 1, seen in FIG. 1, there are arranged a pair of casings 3 and 4 under the filter belt. Said casings 3 and 4 are connected to tanks 7 and 8 via pipes 5 and 6 respectively. The tanks 7 and 8 are in communication with a vacuum pump 10 via a pipe 9. Furthermore pumps 11 are connected to the lower ends of the tanks 7 and 8.

Downstream of the casings 3 and 4, seen in the direction of movement of the upper part of the filter belt 1, there is arranged a microwave oven 12, through which this upper part of the filter belt is led. In a manner known per se the mixture of solids and liquids to be dried can be deposited on the upper part of the filter belt near the left-hand end of said upper part, seen in FIG. 1, all this such that an even layer of a desired thickness of said mixture is formed on the upper part of the filter belt.

By means of the vacuum pump 10, via the tanks 7 and 8 and the pipes 5 and 6, a sub-atmospheric pressure can be generated in the casings 3 and 4, all this such that via the filter belt 1, which is pervious to moisture, liquid from the mixture present o the filter belt 1 is sucked into the casings 3 and 4 and is discharged towards the tanks 7 and 8. Said liquid can be discharged from the tanks 7 and 8 again by means of the pumps 11. All this is a conventional method with filter belts, as i.a. described in the aforesaid patent specifications. Of course the number of casings is not limited to two thereby, but it will also be possible to use only one cabinet or several cabinets, which may or may not be movable in the longitudinal direction of the upper part of the filter belt 1, as is also indicated in the aforesaid patent specifications.

Furthermore also washing devices or the like may be provided, if desired, for rinsing the mixture present on the filter belt, as is also described in the prior art.

The material, still moist, which is left behind on the upper part of the filter belt 1 after having passed the casings 3 and 4 to which a sub-atmospheric pressure is to be applied is then carried through the microwave oven 12 by means of the upper part of the filter belt, in order to be dried further there. Since the material to be dried lies on the filter belt in the shape of a regular, thin layer of material said material is particularly suitable for being dried by means of a microwave oven, so that a particularly efficient drying of the material can be effected.

After having passed the microwave oven the material will be discharged from the belt near the end of the horizontally extending upper part of the belt in a conventional manner, as is indicated by means of the arrow B.

FIG. 2 shows a similar possible embodiment of a device according to the invention, and those parts which correspond with the parts described above with reference to FIG. 1 are provided with the same reference numbers as in FIG. 1, therefore, and will not be discussed again here.

Instead of only one microwave oven 12, as in the preceding embodiment, this embodiment has three microwave ovens 13-15, arranged in a row, seen in the direction of movement of the upper part of the filter belt 1. Between the microwave ovens 13-15, as well as in front of the first microwave oven 13, as well as behind the last microwave oven 15 there are provided "sluices" 16, which prevent that microwaves issue from the ovens in question. By providing said sluices 16 between the successive microwave ovens 13-15 it is prevented that the ovens 13-15 influence and possibly even undo one another's operation.

Using several microwave ovens 13-15 arranged in a row, which can preferably be adjusted and controlled independently, makes it possible in a simple manner to optimize the drying process.

The operation of the oven 12 or any one or several of the ovens 13-15 can e.g. be automatically controlled in dependence on the supply of the material to be dried, such as e.g. the thIckness of the layer, which can be measured by means of a sensor (not shown). By means of a sensor it can also be determined whether there is material present on the upper part of the filter belt or not, so that in the absence of material one or several ovens can be put out of operation. Of course a time lag mechanism will have to be built in, as the sensor will be arranged upstream of the oven(s) and the part of the belt possibly not supporting any material to be dried will pass a relevant oven at a later point of time than that it will pass the sensor.

FIG. 3 illustrates a further embodiment of the device according to the invention, which at least substantially corresponds with the embodiment illustrated in FIG. 1. Corresponding parts are provided with the same reference numbers in both figures, therefore.

As is indicated in FIG. 3 it will also be possible, according to the invention, to arrange casings 3' corresponding with the casings 3 and 4 in the microwave oven 12, which casings 3' are connected, via pipes 5', to a tank 7' corresponding with the tank 7 or 8. Also the tank 7' is in communication with the vacuum pump 10, via the pipe 10. Furthermore a pump 11 is connected to the tank 7'.

The oven 12 is furthermore provided with a connection via which gas or air can be supplied to the oven above the filter belt 1, as is diagrammatically indicated by means of the arrow C in FIG. 3.

Thus a sub-atmospheric pressure will also be generated during operation in the interior of that part of the filter cake which is located inside the oven 12. This promotes the evaporation of the water in the filter cake heated by the microwaves, which appears to have a particularly advantageous effect on the heating of the filter cake by means of the microwave oven.

Gas or air supplied according to arrow C will preferably be used for the cooling of the generators of the microwave oven, so that in this embodiment heated gas or air will be sucked in through the filter cake, which will contribute further to an effective drying of the material.

It will be apparent that also with an embodiment according to FIG. 2 it will be possible to generate a sub-atmospheric pressure in one or several of the microwave ovens 13-15, under the part of the filter belt 1 located in the oven in question, and possibly to effect that heated air or gas can be sucked in through the filter cake.

I claim:

1. A method for removing liquid from a mixture of solids and liquids, where the mixture is deposited on the upper part of an endless drivable filter belt and whereby during operation the upper part of the filter belt is led over at least one first casing in which sub-atmospheric pressure is generated, wherein said first casing is not located inside a microwave oven, characterized in that, after having passed the casing(s) in which a sub-atmospheric pressure is generated, the mixture is carried through at least one microwave oven by means of the filter belt.

2. Method according to claim 1, characterized in that the mixture is carried through at least two microwave ovens arranged in a row.

3. Method according to claim 1, or 2, characterized in that the operation of the microwave ovens is controlled in dependence on the nature of the layer of mixture on the filter belt.

4. Method according to claim 1, characterized in that a sub-atmospheric pressure is generated under the part of the filter belt located inside the microwave oven.

5. Method according to claim 4, characterized in that air used for cooling the microwave oven is sucked into the microwave oven through the filter belt.

6. A device for removing liquid from a mixture of solids and liquids, said device being provided with an endless drivable filter belt and at least one first casing, arranged under an upper part of the filter belt, in which a sub-atmospheric pressure can be generated, wherein said first casing is not located inside a microwave oven, characterized in that there is arranged at least one microwave oven downstream of the casing(s) in which a sub-atmospheric pressure can be generated, seen in the direction of movement of the upper part of the filter belt during normal operation, through which microwave oven the upper part of the filter belt is led.

7. Device according to claim 6, characterized in that there are arranged at least two microwave ovens in a row, seen in the direction of movement of the upper part of the belt, through which the upper part of the belt extends.

8. Device according to claim 7, characterized in that between two successive microwave ovens there is provided at least one means which prevents that microwaves issue from the microwave ovens in question.

9. Device according to claims 7 or 8, characterized in that the microwave ovens can be controlled independentlY.

10. Device according to claim 6 characterized in that at least one sensor observing the nature of the layer of material present on the filter belt is provided, whilst a microwave oven can be controlled by means of the sensor in order to adjust the operation of the microwave oven to the nature of the layer of material present on the filter belt.

11. Device according to claim 6, characterized in that means are provided for generating a sub-atmospheric pressure under a part of the filter belt located inside a microwave oven.

12. Device according to claim 6, characterized in that means are provided for passing air or gas used for the cooling of the microwave oven into the oven through the filter belt.

* * * * *